(12) United States Patent
Brunhuber et al.

(10) Patent No.: US 11,148,196 B2
(45) Date of Patent: Oct. 19, 2021

(54) PRE-TREATMENT, METHOD FOR ADDITIVE PRODUCTION OF A COMPONENT, AND DEVICE

(71) Applicant: Siemens Aktiengesellschaft, Munich (DE)

(72) Inventors: Christian Brunhuber, Auerbach (DE); Axel Papperitz, Munich (DE); Steffen Walter, Oberpframmern (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 365 days.

(21) Appl. No.: 16/091,887

(22) PCT Filed: May 8, 2017

(86) PCT No.: PCT/EP2017/060888
§ 371 (c)(1),
(2) Date: Oct. 5, 2018

(87) PCT Pub. No.: WO2017/194451
PCT Pub. Date: Nov. 16, 2017

(65) Prior Publication Data
US 2019/0105709 A1    Apr. 11, 2019

(30) Foreign Application Priority Data
May 9, 2016 (DE) .......................... 102016207898.4

(51) Int. Cl.
*B22F 1/00* (2006.01)
*B33Y 40/00* (2020.01)
(Continued)

(52) U.S. Cl.
CPC .......... *B22F 1/0085* (2013.01); *B23K 26/342* (2015.10); *B23K 26/703* (2015.10);
(Continued)

(58) Field of Classification Search
CPC ................ B23K 26/342; B23K 26/703; B23K 2101/001; B23K 2103/26; B22F 1/0085;
(Continued)

(56) References Cited

U.S. PATENT DOCUMENTS

| | | | |
|---|---|---|---|
| 2009/0068376 | A1 | 3/2009 | Philippi et al. |
| 2015/0064048 | A1 | 3/2015 | Bessac et al. |

(Continued)

FOREIGN PATENT DOCUMENTS

| | | |
|---|---|---|
| CN | 103866162 A | 6/2014 |
| CN | 105345003 A | 2/2016 |

(Continued)

OTHER PUBLICATIONS

International search report with written opinion dated Sep. 5, 2017, for corresponding PCT/EP2017/060888.
(Continued)

*Primary Examiner* — Brian W Jennison

(57) ABSTRACT

A method for additive production and a correspondingly produced component made of a powdery base material, includes the thermal pre-treatment of the base material at a first temperature of at least 800° C. under an inert gas atmosphere, wherein the first temperature and a duration of the pre-treatment are further selected such that no sintering process of the base material occurs, subsequent cooling of the base material, and additive construction of the component from the thermally pre-treated base material. A corresponding device is for the additive production.

12 Claims, 2 Drawing Sheets

(51) Int. Cl.
- *B33Y 10/00* (2015.01)
- *B23K 26/342* (2014.01)
- *B23K 26/70* (2014.01)
- *C22F 1/10* (2006.01)
- *C22C 1/04* (2006.01)
- *B33Y 80/00* (2015.01)
- *B22F 12/00* (2021.01)
- *B23K 103/18* (2006.01)
- *B23K 101/00* (2006.01)

(52) U.S. Cl.
CPC ............. *B33Y 10/00* (2014.12); *B33Y 40/00* (2014.12); *C22F 1/10* (2013.01); *B22F 12/00* (2021.01); *B22F 2301/15* (2013.01); *B22F 2998/10* (2013.01); *B23K 2101/001* (2018.08); *B23K 2103/26* (2018.08); *B33Y 80/00* (2014.12); *C22C 1/0433* (2013.01); *Y02P 10/25* (2015.11)

(58) Field of Classification Search
CPC .. B22F 10/10; B22F 2301/15; B22F 2998/10; B33Y 1/0085; B33Y 10/00; B33Y 40/00; B33Y 80/00
See application file for complete search history.

(56) References Cited

U.S. PATENT DOCUMENTS

| | | | | |
|---|---|---|---|---|
| 2015/0165545 | A1* | 6/2015 | Goehler | B23K 26/02 |
| | | | | 219/121.15 |
| 2015/0290710 | A1 | 10/2015 | Ackelid | |
| 2016/0175930 | A1* | 6/2016 | She | B01J 8/1836 |
| | | | | 427/455 |
| 2017/0021420 | A1* | 1/2017 | Buller | C04B 35/5626 |

FOREIGN PATENT DOCUMENTS

| | | |
|---|---|---|
| DE | 102005022308 A1 | 11/2006 |
| DE | 102012012344 A1 | 9/2013 |
| DE | 102013226298 A1 | 6/2015 |
| EP | 2060343 A1 | 5/2009 |
| EP | 2756901 A1 | 7/2014 |
| EP | 2910362 A1 | 8/2015 |
| WO | 2014176045 A1 | 10/2014 |
| WO | 2015010200 A1 | 1/2015 |
| WO | 2015023439 A1 | 2/2015 |
| WO | 2015047128 A1 | 4/2015 |

OTHER PUBLICATIONS

Osoba, L O et al, "On preventing HAZ cracking in laser welded DS Rene 80 superalloy", Material Science and Technology, vol. 27, No. 5, pp. 897-902, 2011.

* cited by examiner

PRE-TREATMENT, METHOD FOR ADDITIVE PRODUCTION OF A COMPONENT, AND DEVICE

CROSS REFERENCE TO RELATED APPLICATIONS

This application is the US National Stage of International Application No. PCT/EP2017/060888 filed May 8, 2017, and claims the benefit thereof. The International Application claims the benefit of German Application No. DE 102016207898.4 filed May 9, 2016. All of the applications are incorporated by reference herein in their entirety.

FIELD OF INVENTION

The present invention relates to a method for the additive manufacturing of a component, or to a pretreatment for the method, and to a component produced in a corresponding manner. A device which is configured for operating the method, and a system comprising the device, are furthermore described.

The component is advantageously provided for use in a turbo machine, advantageously a gas turbine. The component is advantageously composed of a superalloy, in particular of a nickel-based or cobalt-based superalloy, or is producible in a corresponding manner. The superalloy can be precipitation hardened or capable of being precipitation hardened. The component can furthermore be composed of a tinder-resistant and/or high-temperature resistant alloy, or comprise the latter.

The component is advantageously provided for the application in a hot gas path in a turbo machine such as a gas turbine.

BACKGROUND OF INVENTION

Additive or generative manufacturing methods comprise, for example, radiation melting methods and/or radiation welding methods. The radiation melting methods include, in particular, selective laser melting (SLM) or electron beam melting (EBM). The radiation welding methods mentioned include, for example, electron beam welding or laser melting deposition (LMD), in particular laser powder melting deposition.

A method for the additive construction of components by means of selective laser melting is known, for example, from EP 2 910 362 A1.

Additive production methods have proven particularly advantageous for components of complex or complicated or delicate designs, for example labyrinth-type structures, cooling structures, and/or lightweight construction structures. In the case of metallic materials, the successive deposition by welding, or the melting, respectively, of individual layers results in a structure having a characteristic microstructure which still differs significantly from a comparable casting. The microstructure that is modified on account of the additive production causes problems in particular when nickel-based or cobalt-based materials such as superalloys are used which, for example, in the use of turbo machines operate under maximum thermal and/or mechanical loads, since this structure provokes hot cracks and/or stress cracks of the materials constructed in a corresponding manner, or is susceptible to said hot cracks and/or stress cracks.

In the research, or the industrial development, respectively, of additive production methods, or the system technology of the latter, attempts are made to maintain the operating temperatures at an ideally high level in order to prevent any rapid cooling of the metal melt and, on account thereof, for a microstructure that is similar to that of the casting to be configured. These processes, in particular such which attain operating temperatures of more than 1000° C., are however not yet refined in industrial terms and require a particularly complex and expensive system technology.

From the prior art, in particular from research pertaining to the "Rene80" superalloy, it is known that a specific temperature treatment, for example at temperatures of more than 1000° C. for a duration of two hours, can at least in part suppress a segregation of boron compounds and thus cracking (cf. "L. O. Osoba et al., On preventing HAZ cracking in laser welded DE Rene 80 superalloy; Material Science and Technology (2011)").

It is furthermore known in the prior art that in particular pulverulent basic material for the additive manufacturing prior to the actual construction is preheated to moderate temperatures of, for example, 100° C. However, these method steps rather serve for drying the basic material which can be hygroscopic, for example, and/or serve for increasing the efficiency of the entire manufacturing process since a welding or melting procedure can be carried out more rapidly in the case of an already preheated powder.

SUMMARY OF INVENTION

It is an object of the present invention to state means which, based on the knowledge of the prior art, can improve the material properties of basic materials for the additive production used in research and development. The material properties which result for additively manufactured components can in particular be improved, for example, in terms of a reduction of the susceptibility to hot cracks by way of the means proposed.

This object is achieved by the subject matter of the independent patent claims. Advantageous design embodiments are the subject matter of the dependent patent claims.

One aspect of the present invention relates to a method for the additive manufacturing of a component from a pulverulent basic material, said method comprising thermally pretreating the basic material at a first temperature, for example of at least 800° C., expediently in a protective gas atmosphere, wherein the first temperature and a duration of the pretreatment furthermore are chosen in such a manner that in particular no substantial or significant sintering procedure of the basic material arises. The pulverulent form of the basic material is thus advantageously maintained herein.

In one design embodiment, the first temperature is at least 800° C.

In one design embodiment, the first temperature is at least 900° C.

In one design embodiment, the first temperature is at least 1000° C.

In one design embodiment, the first temperature is at least 1100° C.

In one design embodiment, the first temperature is 1204° C.

The method furthermore comprises subsequently cooling the basic material, proceeding from the first temperature and the additive construction of the component from the thermally pretreated basic material, advantageously in a corresponding device.

On account of the method described, in particular a heating temperature and heating time, or heating duration, respectively, can advantageously be chosen such that, intermetallic and/or intergranular, boron compounds, or borides, respectively, (for example M5B3 borides), carbon compounds, or carbides, respectively, and/or further component parts which are required in various material systems remain distributed across the respective grain and are not increasingly formed on the grain boundaries but instead can diffuse away from the grain boundaries by way of or during the pretreatment. Besides the segregation of the component parts that create the γ phase and/or γ' phase, the segregation of the borides/carbides mentioned on the grain boundaries is a substantial driver for forming hot cracks when welding or melting high-performance materials by means of additive production.

The present invention relates in particular to the pretreatment of pulverulent and/or granular basic material, wherein in particular as compared to a pretreatment of solids as is alluded to, for example, in the prior art, there are the additional issues that at all times sufficient cooling and/or checking of the respective diffusion procedures has to be performed after heating, in particular on account of the consistent presence of air enclosed between the powder particles.

By way of the concept proposed it can in particular be demonstrated that, on account of the method, substantially shorter cracks, for example cracks having a length of less than 100 μm which can subsequently be closed again, for example by means of a hot isostatic pressing, arise in the thermally pretreated basic material and/or in the completed component as compared to a method without the pretreatment according to the invention.

In one design embodiment, the cracks mentioned after the thermal pretreatment and/or after the additive construction are treated by hot isostatic pressing and are advantageously at least in part closed.

Furthermore, on account of the pretreatment, another microstructure is advantageously generated, having in particular a coarser grain, this advantageously resulting in an improved creep resistance of the material in the component.

As compared to additive methods in which temperatures of, for example, more than 800° C. and above prevail during the construction, the "preheating" represents an additional, substantially more cost-effective and/or simpler manner for avoiding hot cracks.

In one design embodiment, the thermal pretreatment is carried out in such a manner that a diffusion length, in particular a mean diffusion length, of component parts, in particular of boron compounds and/or carbon compounds, or creators of a γ phase and/or γ' phase of a superalloy, of the basic material at the first temperature is larger than a mean grain size, for example a grain diameter or a grain radius, of powder particles of the basic material, advantageously averaged across all powder particles of the basic material. This design embodiment advantageously enables a diffusion of the component parts mentioned, advantageously at least across the respective grain of the respective powder particle, advantageously within the entire particle. In other words, it can be enabled that the component parts mentioned can be diffused away from grain boundaries and in particular a segregation of the borides, carbides, and/or of the γ creators and/or γ' creators is thus avoided. On account thereof, the formation of hot cracks or other structural faults, for example in operation or during the additive construction of the respective component, can be prevented.

In one design embodiment, the thermal pretreatment is carried out in such a manner, or the first temperature and/or the duration of the pretreatment, respectively, are/is chosen in such a manner that a precipitation or segregation of, in particular intergranular, borides and/or carbides is minimized.

The correlation mentioned between the diffusion length and the mean grain size can furthermore be caused by the temperature and/or the duration of the pretreatment being chosen in a corresponding manner.

The diffusion length is advantageously a thermal mean diffusion length of the respective component parts.

In one design embodiment, the thermal pretreatment is carried out in such a manner, or the temperature and/or the duration of the pretreatment is chosen in such a manner, that an in particular significant segregation, in particular of boron compounds or carbon compounds, or creators of a γ phase and/or γ' phase of the superalloy on grain boundaries of powder particles of the base material is prevented.

In one design embodiment, the first temperature is chosen in such a manner that a so-called solvus temperature for the γ phase and/or γ' phase of the basic material is exceeded.

In one design embodiment, the cooling is carried out in such a manner that the basic material is cooled, for example to room temperature, by way of a temperature gradient of at least 150 K/min, advantageously 200 K/min. Alternatively, the basic material in the context of the thermal pretreatment can be cooled to a temperature above or below the room temperature by way of the temperature gradient mentioned. The rapid cooling can be necessary in particular in order for a driving force for a so-called athermal phase transformation to be generated. In particular, the cooling procedure has to be performed sufficiently rapidly in order for (further) diffusion procedures in the basic material to be prevented and to thus preserve the composition or distribution of the basic material generated by the pretreatment for the additive construction of the component, for example. On account thereof, the basic material can be cooled in a sufficiently rapid manner, for example in order for undesirable precipitations to be prevented and for the state that was attained by the previous temperature level (first temperature) to be "frozen".

In one design embodiment, the temperature gradient when cooling the basic material is between 100 and 300 K/min.

In one design embodiment, the duration of the thermal pretreatment is at least two hours. This period can in particular be sufficient in order for the abovementioned diffusion procedures of the components mentioned to be excited or completed advantageously in each grain or in a plurality of the grains of each powder particle.

In one design embodiment, the duration of the thermal pretreatment is between one and five hours, for example two or four hours.

In one design embodiment, the thermal pretreatment comprises keeping the basic material at the first temperature for at least two hours.

In one design embodiment, the duration of the thermal pretreatment is at least four hours. The duration mentioned can in particular refer to the period during which the first temperature and/or the second temperature (see below) according to the method described are kept constant in total.

In one design embodiment, the thermal pretreatment comprises heating the basic material to a first temperature of at least 1000° C., advantageously 1200° C., by way of a temperature gradient of at least 5 K/min, advantageously 10 K/min. This design embodiment is in particular expedient for a moderate or slow heating in which the diffusion procedures and/or a thermal equilibrium are/is specifically required and are not to be prevented as, for example, in the case of the cooling described.

In one design embodiment, the thermal pretreatment comprises heating the basic material to the first temperature by way of a temperature gradient of significantly above 10 K/min. Such temperature gradients or even substantially higher ones can in particular be applied in the case of powder material as the basic material, whereas "heating rates" for a thermal treatment of "bulk" material (non-pulverulent "voluminous material") may be restricted on account of a risk of stress or cracks.

In one design embodiment, the temperature gradient when heating the basic material is between one and 20 K/min.

In one design embodiment, the thermal pretreatment, advantageously after heating or reheating to the first temperature, comprises cooling or partial cooling to a second temperature or an "intermediate" temperature, in particular to a temperature between 1100° C. and 1200° C., by way of a temperature gradient of at least 150 K/min, advantageously 200 K/min. As in the embodiment described above, the temperature gradient described can be required in order for diffusion processes during cooling to be prevented.

In one design embodiment, the second temperature or "intermediate" temperature describes a temperature below the solvus temperature mentioned, advantageously just below or only a few ° C. below, such as for example 10° C. or 20° C. below the respective solvus temperature.

In one design embodiment, the second temperature is between 800° C. and 1200° C.

In one design embodiment, the second temperature is 1120° C.

In one design embodiment, the thermal pretreatment comprises keeping the basic material at the second temperature for at least two hours. Such a design embodiment can in particular be required or advantageous in order for moderate hardnesses of the basic material to be set, wherein however no segregation is yet, as has been described above, created on the grain boundaries.

In one design embodiment, the thermal pretreatment is carried out in such a manner, or the temperature(s), that is to say advantageously the first temperature, the second temperature, and/or the duration of the pretreatment, are/is chosen in such a manner that the basic material during cooling thereof after the thermal pretreatment is imparted a martensitic, diffusion-free and/or athermal transformation, in particular phase transformation.

In one design embodiment, the thermal pretreatment is carried out in a device that is different from a conventional system for the additive construction or the additive manufacturing.

In one design embodiment, the basic material is heated in a homogeneous manner during the thermal pretreatment, in order for diffusion processes to be performed in a likewise homogeneous manner, for example so as to be distributed across the entire powder volume of the basic material.

In one design embodiment, the basic material is cooled homogeneously during and/or after the thermal pretreatment. A particularly homogeneous negative temperature variation can be required because inhomogeneities in the temperature variation (for example distributed across the volume of a grain or of the entire particle), that is to say for example large temperature variations on the periphery of a powder container, can prevent diffusion processes.

In order for the material phases of the individual grains of the basic material or the powder particles thereof to be "set" it is in particular required or advantageous for the diffusion processes mentioned to be performed in a homogeneous manner across a reservoir of the basic material, for example.

In one design embodiment, the basic material is a basic material for a superalloy in particular comprising boron, and being based on nickel or cobalt.

One further aspect of the present invention relates to a component which is manufactured or capable of being manufactured according to the method, furthermore comprising a grain distribution having a mean grain size of less than 200 µm, advantageously less than 100 µm. Furthermore, the component in terms of the creep resistance thereof and/or hot crack susceptibility thereof can have a microstructure that is improved as compared to components additively manufactured in the conventional manner.

One further aspect of the present invention relates to a method for preparing or pretreating the pulverulent basic material for the additive manufacturing, said method comprising thermally pretreating, or the thermal pretreatment of, respectively, the basic material as described above, as well as cooling the basic material as described, said cooling being subsequent to the thermal pretreatment.

One further aspect of the present invention relates to a device for the additive manufacturing of the component, said device comprising a heating installation, for example an inductive heater or a radiation heater, and a cooling installation, wherein the device is specified or configured for operating the method.

The heating installation as well as the cooling installation can in particular be configured in such a manner that the basic material can be heated in a particularly homogeneous manner, however in particular can be cooled in a homogeneous manner. A vessel for the pulverulent basic material can likewise be configured in a corresponding manner, for example be round or spherical or be otherwise shaped, in order for an ideally uniformly distributed temperature gradient or uniform cooling, for example across the entire powder to be treated, to be enabled.

The cooling installation can be based, for example, on dry ice or liquid nitrogen, in order for the high temperature gradients described when cooling to be enabled.

One further aspect of the present invention relates to a system for the additive manufacturing of the component, said system comprising the device, wherein the system is a laser melting deposition device or a device for the powder-bed-based additive construction or manufacturing, respectively, of the component, in particular for selective laser melting.

Design embodiments, features, and/or advantages which presently relate to the methods described, can furthermore relate to the device, to the system, and/or to the component, or vice versa.

BRIEF DESCRIPTION OF THE DRAWINGS

Further details of the invention will be described hereunder by means of the figures, in which.

DETAILED DESCRIPTION OF INVENTION

The same elements or elements with equivalent functions can be provided in each case with the same reference signs in the exemplary embodiments and figures. In principle, the illustrated elements and the mutual size ratios thereof are not to be considered as true to scale; rather, individual elements can be illustrated so as to be dimensioned in an exaggerated thick or large manner for the sake of improved visualization and clarity.

Figure 1:
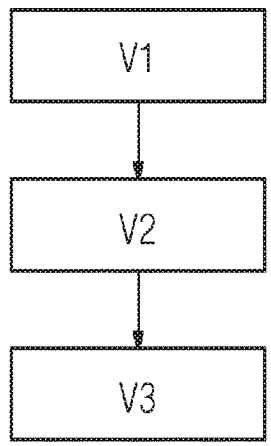
FIG. 1 shows a schematic flow diagram of method steps of the present invention.

FIG. 1 indicates method steps of the method of the present invention. In particular, method step V1 refers to thermally pretreating a pulverulent basic material 1 (cf. FIGS. 3 and 4 below) for the additive manufacturing of the component 10 (cf. FIG. 5). The thermal pretreatment indicated according to the invention comprises heating the basic material to a first temperature of at least 800° C., advantageously at least 900° C., particularly advantageously 1000° C. or more. The first temperature can be, for example, 1200° C. or more, in particular 1204° C. (cf. FIG. 2).

In order for an excessive oxidation of the basic material to be avoided in particular during the thermal pretreatment, said thermal pretreatment is advantageously carried out in a protective gas atmosphere, for example comprising nitrogen, advantageously however using argon as the protective gas.

The thermal pretreatment is provided in particular for causing diffusion processes in individual powder particles of the basic material, in particular in individual grains of the powder particles of the basic material, said diffusion processes leading to an improved phase composition or material composition of the basic material or of the completed component, respectively.

The completed component in particular advantageously has a grain distribution having a mean grain size of less than 200 µm, advantageously less than 100 µm, particularly advantageously less than 50 µm or even less.

The completed component furthermore advantageously displays a significantly reduced tendency toward hot cracks or other structural defects such as creep deformations. In particular, substantially fewer and/or shorter cracks, for example cracks having a length of less than 100 µm which according to the invention can at least in part be closed again efficiently by means of hot isostatic pressing are created. Furthermore, another microstructure, in particular a coarser grain, is attained on account of the thermal pretreatment, this advantageously resulting in a higher creep resistance of the material.

The first temperature and/or a duration of the thermal pretreatment are/is furthermore chosen in such a manner that no significant sintering or initial sintering of the basic material arises, that is to say that the basic material after the thermal pretreatment is advantageously still present in the pulverulent form having the same powder or particle fraction, respectively, as prior to the thermal pretreatment.

Method step V2 advantageously describes cooling according to the invention of the basic material that is performed subsequently (that is to say after the thermal pretreatment), said cooling proceeding from the first temperature. Cooling V2 is described in detail and in an exemplary manner in FIG. 2.

Figure 4:
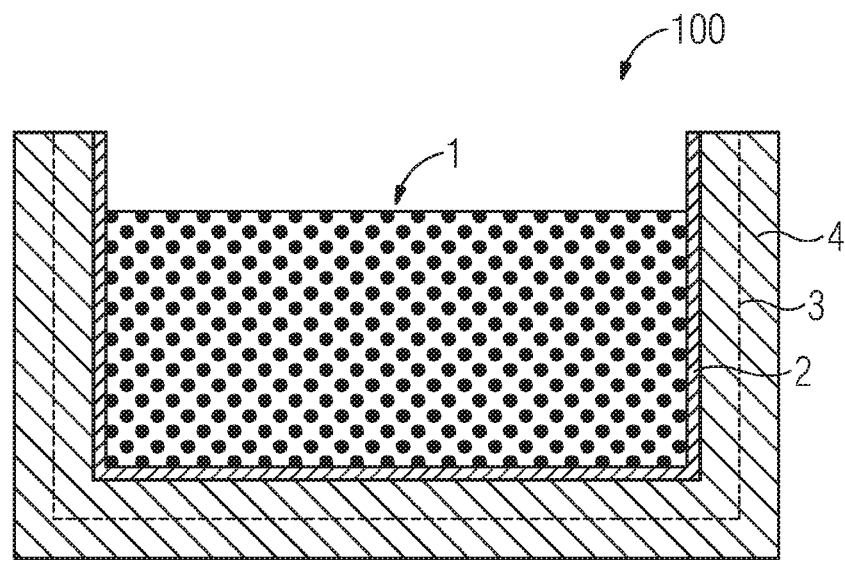
FIG. 4 shows a schematic sectional view of a device according to the invention for additive manufacturing.
Figure 5:
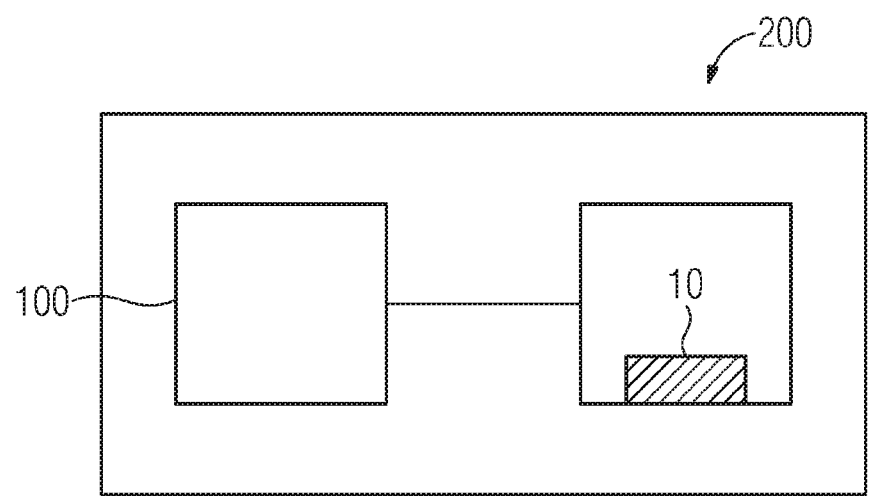
FIG. 5 shows a schematic view of a system according to the invention for additive manufacturing.

Method step V3 refers to the additive construction or manufacturing of the component part from the thermally pretreated basic material, advantageously in a corresponding device or system (cf. reference signs 100, 200 in FIGS. 4 and 5).

Figure 2:
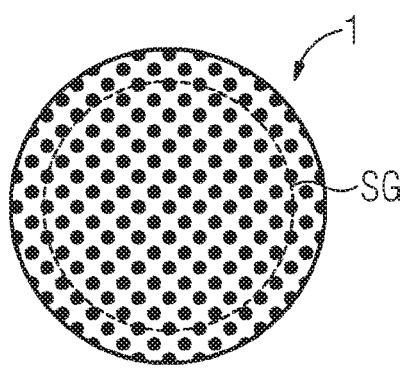
FIG. 2 in a schematic and simplified manner indicates a material composition of component parts of a basic material for additive manufacturing.

FIG. 2 schematically shows a simplified section through a monocrystalline grain or powder particle, respectively, of the basic material 1. By way of the uniform punctuation of an interior space of the grain 1 in FIG. 2 it is to be indicated, for example, that the material or metal grain has already been thermally pretreated according to the invention and accordingly has a homogeneous material composition. In other words, no significant segregations or concentration gradients of individual component parts, for example of alloy elements of the basic material, are to be seen.

The circular dashed line SG indicates in a simplified manner in particular a potential position of a boundary of segregations, for example of boron compounds or carbon compounds, which are present in conventional pulverulent material for superalloys or in powder particles which have not been thermally pretreated according to the present invention. The segregations mentioned can also relate to other component parts, for example contaminations of the basic material 1. Moreover, such a segregation can relate to the distribution of a γ phase and/or a γ' phase for the component parts that form the superalloy.

In particular, by way of the method according to the invention, the preheating temperature and the duration are chosen such that component parts in the metal of the basic material, advantageously in each particle of the latter, can diffuse, on the one hand, but no sintering procedure or solidification of the metal powder arises yet, on the other hand. In particular, the preheating temperature and time are to be chosen such that intermetallic or intergranular boron compounds or carbon compounds, respectively, such as borides, for example $M_5B_3$ borides ("M" may refer to a metallic element) or carbides cannot significantly or excessively form on the grain boundaries or diffuse away from the grain boundaries, respectively.

Apart from the segregation of the creators of the γ phase, the segregation of borides or carbides on the grain boundaries is a substantial driver for the formation of hot cracks when welding or melting the basic material 1.

For example, the thermal pretreatment can be carried out and/or chosen in such a manner that a diffusion length of component parts, in particular of boron compounds or carbon compounds, or creators of a γ phase of a superalloy, of the basic material 1 at the first temperature is larger than a mean grain size of powder particles of the basic material 1.

The thermal pretreatment can furthermore be carried out in such a manner that the basic material during cooling is imparted a martensitic, diffusion-free, and/or athermal transformation.

Figure 3:
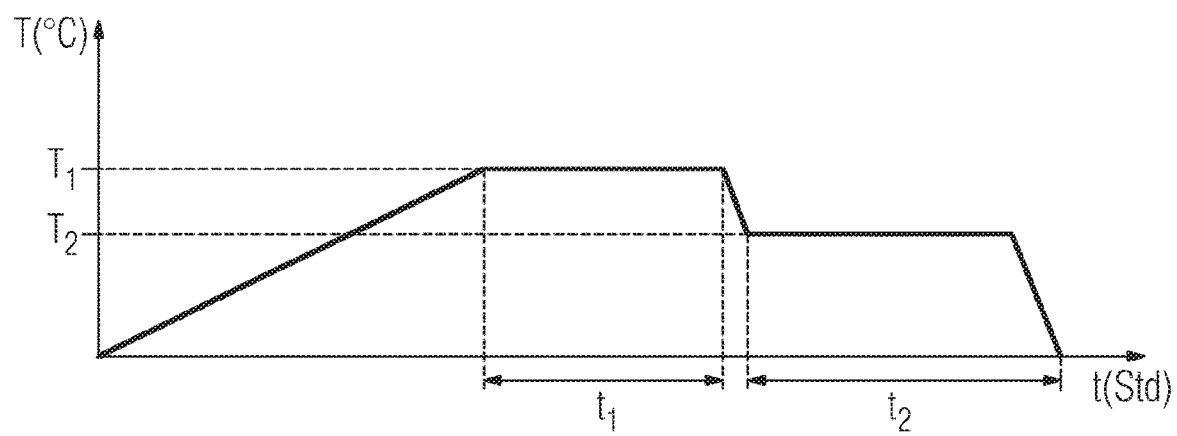
FIG. 3 shows an exemplary simplified temperature profile of a thermal pretreatment according to the method described.

FIG. 3 shows a schematic exemplary temperature profile of the thermal pretreatment according to the invention:

In particular, proceeding from the origin of the coordinates, a comparatively slow heating of the basic material, advantageously in a respective device (cf. reference sign 100 in FIG. 4), to a first temperature T1 is indicated. The first temperature T1 is advantageously at least 800° C. or more, as has been described above. For example, the first temperature T1=1204° C.

The origin of the coordinate system presently does not necessarily have to describe a zero point. In particular, the graph of the temperature profile shown in FIG. 3 for t=0 advantageously touches the y-axis at room temperature or at a temperature of 20° C., for example.

The temperature gradient, or the incline of the temperature "ramp" of heating shown, is 10 K/min, for example. Alternatively, the basic material can also be heated more slowly, for example, or else somewhat faster to the first temperature, for example by way of a temperature gradient of 1 to 20 K/min, or even more.

Thermal pretreating subsequent to a heating phase advantageously comprises keeping the basic material at the first temperature T1 for a duration of, for example, two hours or more (t1=2 h), advantageously of at least 1 hour.

The first temperature T1 can refer to a solvus temperature, in particular a γ solvus temperature, above which the γ creators mentioned can be released, for example, and/or diffuse in the basic material.

Furthermore subsequently, the pretreatment according to the invention can comprise a relatively rapid cooling to a second temperature T2 or an intermediate temperature. The second temperature T2 is advantageously a few 100° C. lower than the first temperature T1. Cooling can be carried out in such a manner that the basic material 1 is cooled by way of a temperature gradient of 200 K/min, for example. The temperature gradient mentioned when cooling according to the invention can however comprise values between 100 and 300 K/min, for example.

The thermal pretreatment subsequent to a heating phase advantageously comprises a further period or duration in which the basic material of the basic material is kept at the temperature T2, advantageously for a duration of likewise two hours, for example, or more (t2=2h). The duration t1 can correspond to the duration t2 or be longer or shorter.

As opposed to the illustration in FIG. 3, the method for the thermal pretreatment can comprise a further temperature variation, for example by way of further slight cooling to a temperature T3, wherein the temperature T3 can likewise be lower than the temperature T1 and the temperature T2, for example.

It is furthermore shown in FIG. 3 that the method, once the basic material 1 has been kept at the temperature T2 for a duration of, for example t2 equals 2 hours, comprises cooling to an original temperature, for example room temperature.

The temperature gradient of this cooling procedure advantageously corresponds to the temperature gradient which has been described above and describes the transition between the temperature T1 in the temperature T2.

In particular, the temperature gradient when cooling the basic material 1 is substantially higher than that when heating (cf. above). In particular, the undercooling or cooling has to be sufficiently deep and rapid in order for a driving force required for the athermal phase transformation to be generated, for example, and in order for significant diffusion procedures during the cooling phase to be prevented. The required undercooling and cooling rate depend heavily in particular on the material in question, or on the alloy component parts thereof, and can vary across a wide range. A person skilled in the art of developing alloys for turbo machines is however in a position to choose the method for the pretreatment of the basic material in such a manner that the advantageous material compositions or material phases described above are set in a completed component from a superalloy.

The basic material 1 presently advantageously relates to an initial material for the additive manufacturing of a component from a nickel-based or cobalt-based superalloy.

FIG. 4 shows a device 100 in a schematic sectional view. The device 100 is advantageously configured for operating the method described. The device 100 is advantageously different from a conventional system or device for the additive manufacturing of a component.

The device 100 comprises a container 2 for holding the basic material 1, for example in the case of powder-bed-based additive manufacturing methods.

Furthermore, the device 100 comprises in particular a heating installation 4 for heating the basic material 1 according to the method described. The basic material 1 according to the invention is advantageously heated in a particularly homogeneous manner in order to allow diffusion processes to take place in a likewise homogeneous manner, for example distributed across the entire powder bed of the basic material 1.

The device 100 furthermore comprises a cooling installation 3 which is likewise advantageously configured in such a manner that the basic material 1 can be cooled in a particularly homogeneous manner and/or particularly effectively and rapidly. It can in particular be provided according to the invention that the basic material is cooled by the cooling installation 3 according to the temperature gradients described above. This can comprise, for example, rapid quenching of the container 2 in water or liquid nitrogen, or cooling based on dry ice. Alternatively or additionally, the cooling installation 3 can comprise gas cooling, for example. To this end, a cooled gas, for example argon or nitrogen can be provided. The above-mentioned protective gas can be used as "cooling gas", for example when the device 100 is integrated in a system for additive manufacturing (cf. hereunder).

The cooling installation 3 is advantageously disposed within the heating installation 4. Alternatively however, the heating installation 4 can also be disposed within the cooling installation 3.

As opposed to the illustration in FIG. 4, the abovementioned container can also have a shape other than the angular shape shown, for example a spherical shape for a particularly homogeneous setting of the temperature by way of the thermodynamic equilibrium.

FIG. 5 shows a system 200 according to the invention for the additive manufacturing of a component 10. The component 10 is indicated in a window (not explicitly identified) of the system 200. The system 200 comprises the device 100. The system 200 is furthermore advantageously a system for laser melting depositing, or for the powder-bed-based additive construction of the component 10, in particular for selective laser melting, or a corresponding device.

The invention by way of the description by means of the exemplary embodiments is not limited to the latter but comprises each new feature and each combination of features. This includes in particular each combination of features in the patent claims even when said feature or said combination per se is not explicitly stated in the patent claims or the exemplary embodiments.

The invention claimed is:

1. A method for additive manufacturing of a component from a pulverulent basic material for a nickel-based or cobalt-based superalloy, the method comprising:
   thermally pretreating the basic material at a first temperature of at least 800° C. for a duration, wherein the first temperature and the duration of the pretreatment furthermore are chosen so that no sintering of the basic material arises wherein the basic material includes component parts that are selected from the group consisting of a boron compound, a carbon compound, a creator of a γ phase of a superalloy and combinations thereof;

subsequently cooling the basic material; and additively constructing the component from the thermally pretreated basic material, wherein the thermal pretreatment is carried out in so that that a diffusion length of component parts of the basic material at the first temperature is larger than a mean grain size of powder particles of the basic material.

2. The method as claimed in claim 1, wherein the thermal pretreatment is carried out so that a segregation on grain boundaries of powder particles of the basic material is prevented, or wherein the thermal pretreatment is carried out so that a segregation, of component parts, on grain boundaries of powder particles of the basic material is prevented.

3. The method as claimed in claim 1, wherein the cooling of the basic material, includes cooling the basic material by way of a temperature gradient of at least 150 K/min to room temperature.

4. The method as claimed in claim 1, wherein the duration of the pretreatment is at least two hours.

5. The method as claimed in claim 1, wherein the pretreatment comprises heating of the basic material to a first temperature of at least 1000° C. by way of a temperature gradient of at least 5 K/min.

6. The method as claimed in claim 1, wherein the pretreatment after heating to the first temperature, comprises cooling to a second temperature, and/or a temperature between 1100° C. and 1200° C., by way of a temperature gradient of at least 150 K/min.

7. The method as claimed in claim 1, wherein the thermal pretreatment is carried out so that the basic material during cooling is imparted a martensitic transformation.

8. The method as claimed in claim 1, wherein the thermal pretreatment is carried out in a device comprising a container for holding the basic material that includes a heating installation for heating the basic material and a cooling installation that cools the basic material.

9. The method as claimed in claim 1, wherein the basic material is heated and/or cooled in a homogeneous manner during and/or after the thermal pretreatment.

10. The method as claimed in claim 3, wherein the cooling is carried out by way of a temperature gradient of 200 K/min.

11. The method as claimed in claim 6, wherein the pretreatment after heating to the first temperature, comprises cooling by way of a temperature gradient of 200 K/min.

12. The component as claimed in claim 1, wherein the grain distribution has a mean grain size of less than 100 μm.

* * * * *